April 3, 1956 L. F. ASHFORD 2,740,541
ARTICLE HANDLING MACHINE
Filed June 4, 1949 6 Sheets-Sheet 1

WITNESSES
INVENTOR:
Leonard F. Ashford
BY
ATTORNEYS.

April 3, 1956 — L. F. ASHFORD — 2,740,541
ARTICLE HANDLING MACHINE
Filed June 4, 1949 — 6 Sheets-Sheet 2

INVENTOR:
Leonard F. Ashford
BY Paul & Paul
ATTORNEYS.

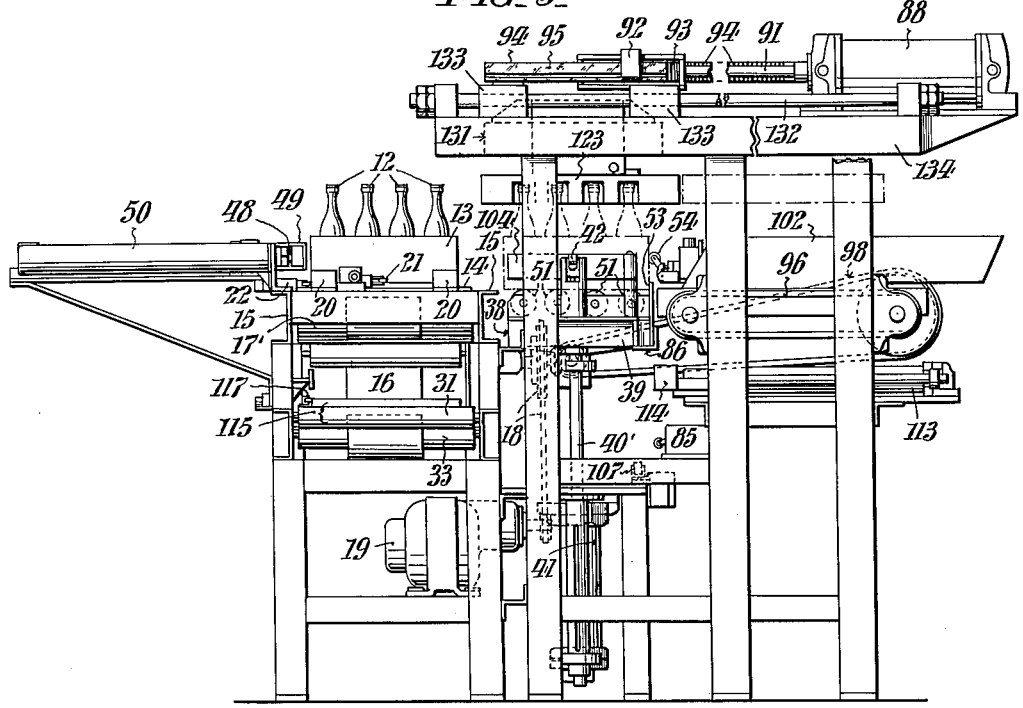
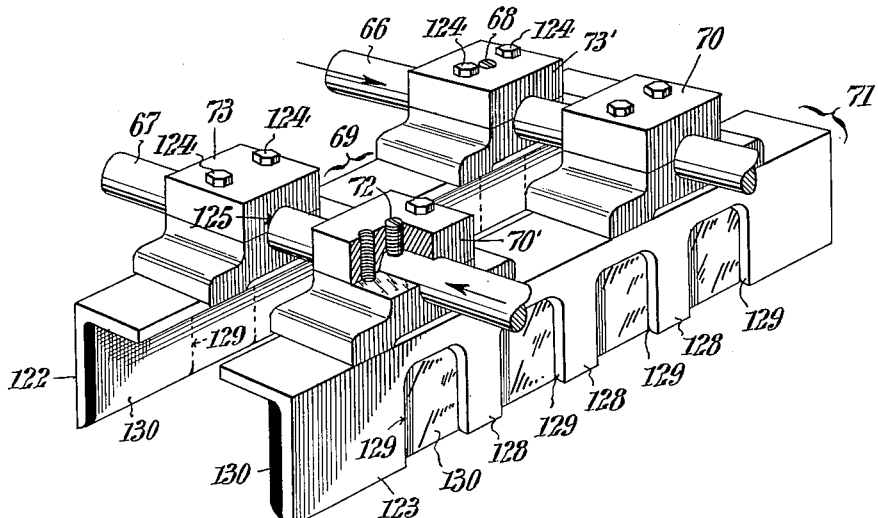

April 3, 1956 L. F. ASHFORD 2,740,541
ARTICLE HANDLING MACHINE
Filed June 4, 1949 6 Sheets-Sheet 4
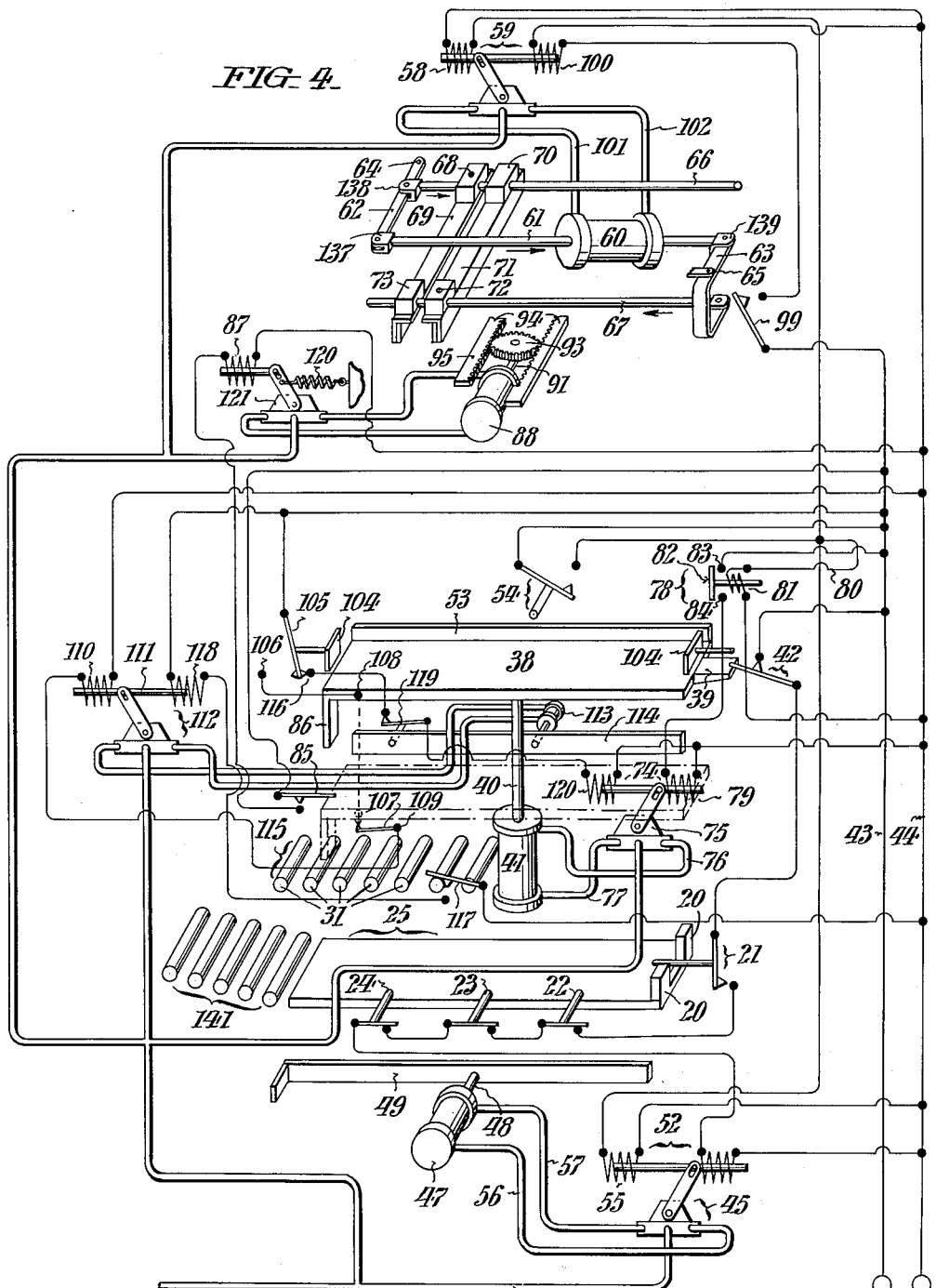
WITNESSES
Thomas W. Kerr, Jr.
A. J. Brittingham
INVENTOR:
Leonard F. Ashford
BY Paul & Paul
ATTORNEYS.

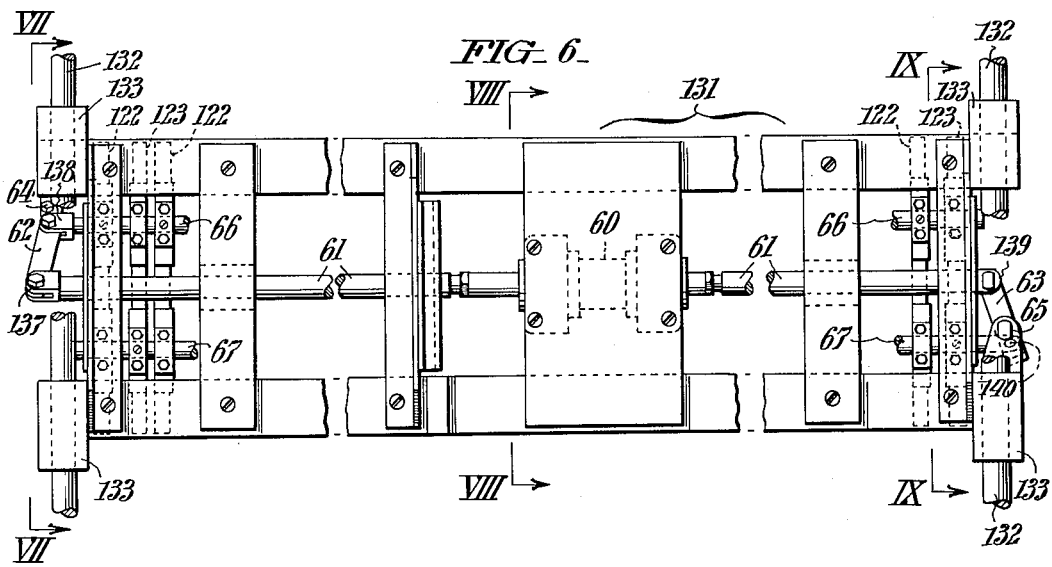

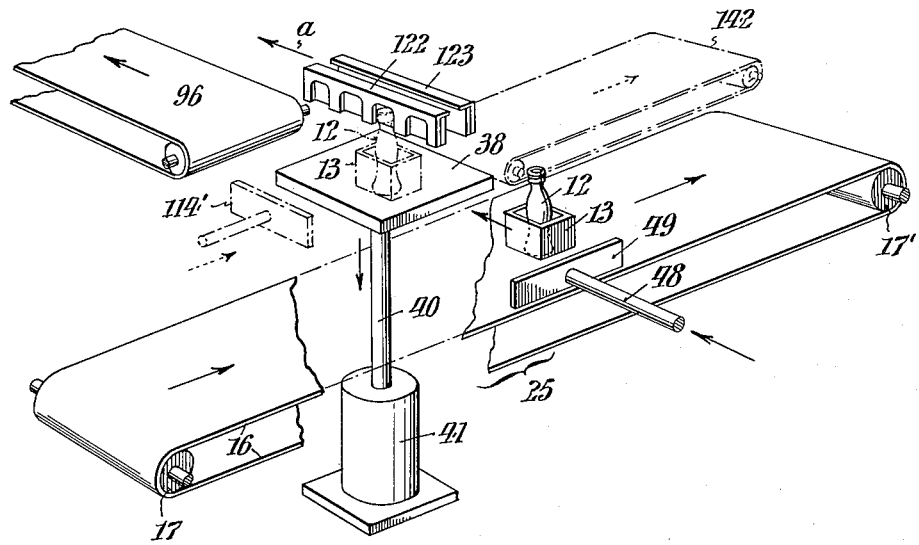
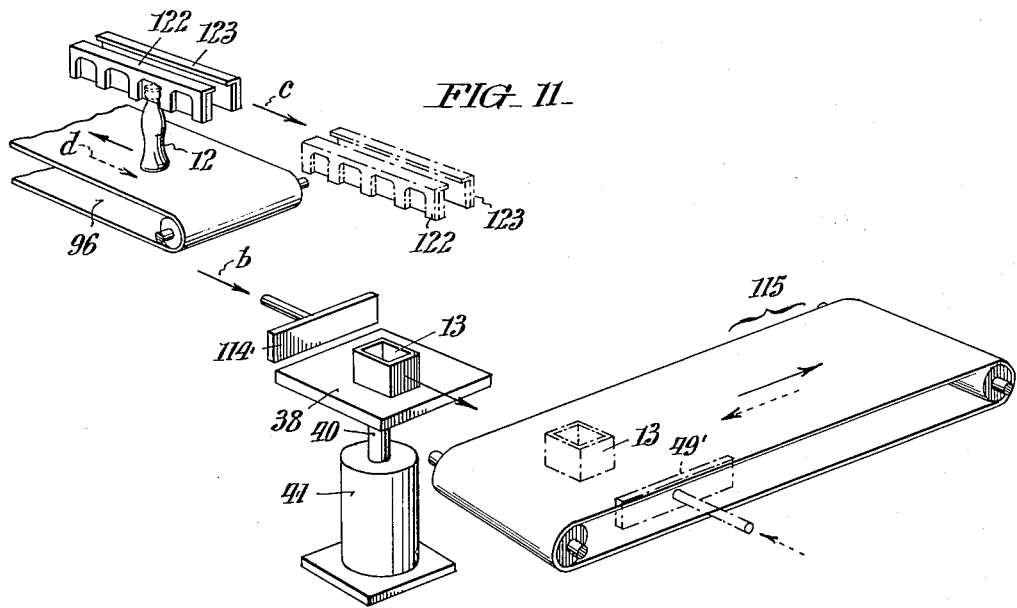

United States Patent Office 2,740,541
Patented Apr. 3, 1956

2,740,541
ARTICLE HANDLING MACHINE
Leonard F. Ashford, Philadelphia, Pa.

Application June 4, 1949, Serial No. 97,179

24 Claims. (Cl. 214—309)

This invention has general reference to article handling apparatus or devices and, more particularly, relates to the automatic species or form thereof adapted for moving packaged or packageable articles between their containers and the handling conveyors. Specifically my invention in its more definite aspects relates to a bottle handling machine embodying a novel clamp which automatically clasps the necks of a series of bottles, and thereby affords means for transporting a group of bottles to and from a bottle case or cases in unchanged relative positions.

In many beverage bottling plants, cases of empty bottles are unloaded at an unloading station for conveyance through washing, refilling, sealing, capping and re-casing operations. In some instances the washing and refilling operations are performed manually but in others relatively intricate automatic machines are employed to perform various stages of these operations. Such automatic machines are quite frequently employed for washing bottles as well as for filling and capping clean bottles and, while said machines have been found to be efficient and economical, they have disadvantages in that the empty bottles are often removed from their cases manually and the refilled bottles are similarly loaded by hand into the bottle cases, with the result that the entire washing and refilling operation is substantially slowed down with an attendant increase in labor costs.

Furthermore some automatic handling methods have been devised for loading and unloading cans but they depend upon steps which subject the containers to sudden shocks and are therefore not practicable for handling fragile bottles. Moreover, many automatic can and bottle handling machines allow the cans or bottles to become mixed or otherwise changed in their relative positions, instead of retaining the desired spaced position, hence such machines are unsuitable for loading bottles or cans into partitioned cases having compartments of predetermined geometric configuration for carrying special forms and sizes of bottles.

It is, accordingly, a fundamental object of this invention to provide an automatic article handling device adapted to move a row of articles, between an external position and a position in a suitable container while preserving the desired positional relation of such articles.

Another object of this invention is to provide a rapid continuous automatic device, apparatus or machine, for transferring articles in either direction between an article container and a conveyor therefor.

A further object is to provide a high capacity economical device or machine of the species above indicated, for moving bottles into and out of cases without damage.

Other objects, with ancillary advantages, and means for carrying such objects into effect will be apparent from the following detailed description of one practical embodiment of my invention as illustrated by the accompanying drawings, wherein like reference characters designate corresponding parts in all the views; while the appended claims more particularly define the features of novelty over the prior art.

Fig. 2 is a side elevation of the machine as viewed looking upwardly from below Fig. 1.

Fig. 3 is an end elevation of the machine shown by Figs. 1 and 2 looking from the right-hand towards the left-hand thereof.

Fig. 4 is a diagrammatic perspective view indicating the principal features of the article handling machine and showing the electrical connections, as well as certain associated pneumatic devices and all of which are hereinafter fully clarified.

Fig. 5 is an enlarged perspective view of the novel article gripping or clamping device of my invention.

Fig. 6 is an enlarged plan view of the carriage for the clamping device aforesaid and which constitutes a removable unit.

Fig. 7 is a sectional view taken on the plane designated by the arrows VII—VII in Figs. 2 and 6.

Fig. 8 is a sectional view taken on the plane designated VIII—VIII in Figs. 2 and 6.

Fig. 9 is a sectional view taken on the plane designated IX—IX in Figs. 2 and 6.

Fig. 10 is a schematic perspective diagram showing the principal operative parts of my case handling machine; and Fig. 11 is a similar diagram representing another stage involved in the article handling operation.

Figure 1:
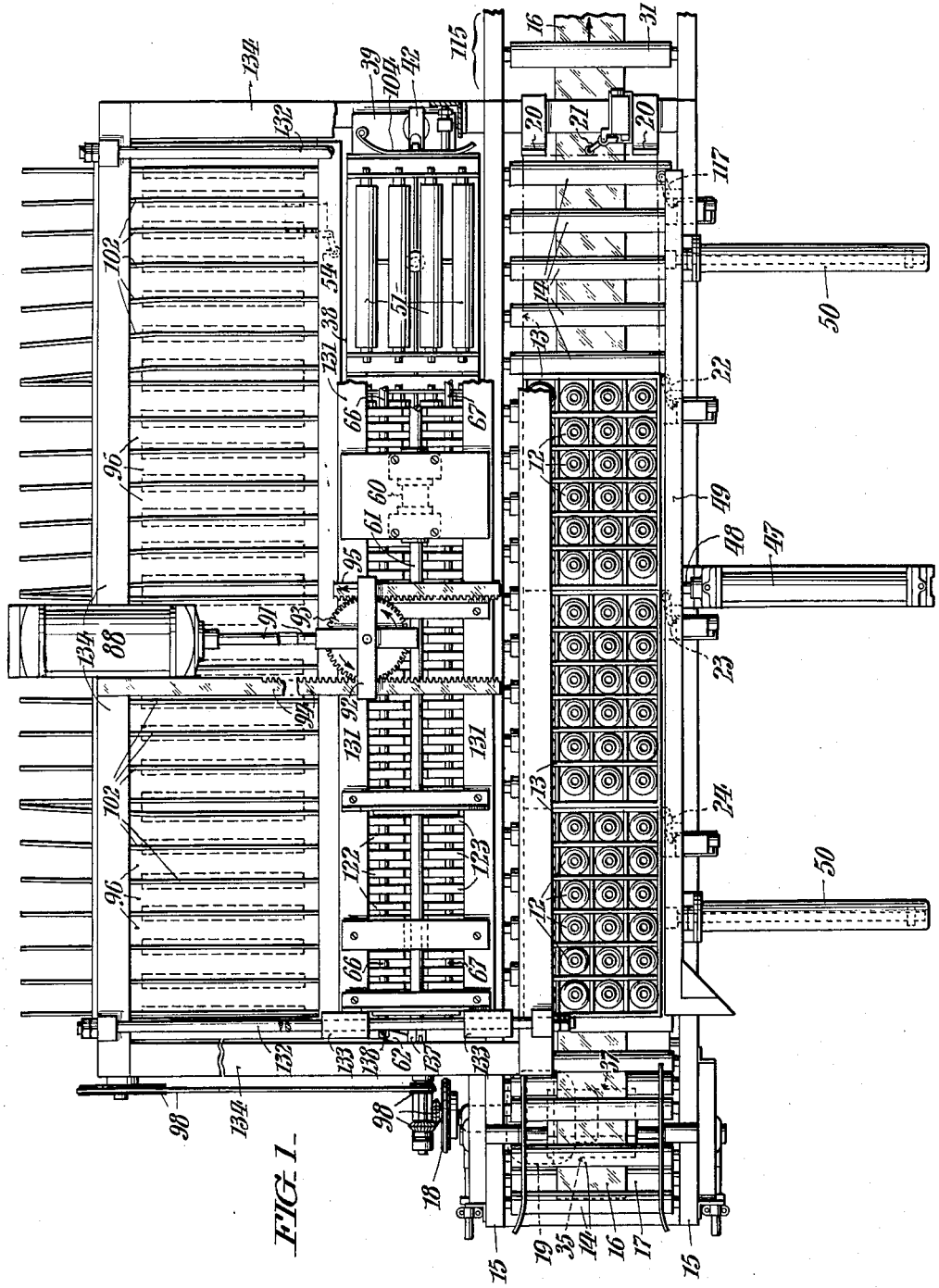
Fig. 1 is a plan view of a preferred embodiment of my improved article handling machine as adapted to unload empty bottles from and replace the same or others in conventional shipment cases; said cases entering the machine at the left-hand and being discharged at the right-hand, while the bottles are removed by the unit shown at the top of the drawing.

In describing the form of my invention exemplified by the accompanying drawings, specific terms will be employed for the sake of clarity, but it is to be expressly understood the scope of said invention is not thereby limited; each such term being intended to embrace all equivalents which perform the same function for an analogous purpose.

Referring to the drawings and, more particularly, to Figs. 1-4 which illustrate a preferred embodiment of my invention it is to be understood the machine shown is adapted to unload rows of bottles 12 from four cases 13 at the same time. The cases 13, containing empty bottles 12, enter the machine, from the left for example, onto spaced rolls 14 journaled in suitable bearing members 15 and said rolls are rotated by contact with an endless belt 16 trained about appropriate end rollers 17, 17', while said belt 16 is driven by means 18 from a motor 19. When the leading case 13 on the endless belt 16 is brought to rest against stationary stops 20 an initial electric switch 21 is closed, see Figs. 1 and 2 to best advantage, and through appropriate connection with consecutively closed successive switches 22, 23 and 24, incident to contact with each succeeding case 13. It will, therefore, be readily understood from Fig. 4, that the electric circuit through switches 21, 22, 23 and 24, is open unless the four cases 13 are properly positioned by the endless belt 16 in order to complete said circuit. At this juncture it is to be noted from Fig. 2, that the upper flight 25 of the endless belt 16 is trained over the main end rollers 17, 17' and spacedly-intervening drag-preventing rolls 26 and 28, of smaller diameter, for the return flight. The belt 16 is trained downwardly about a pair of vertically spaced rolls 29, 30 and, from the latter, for operative coaction below another or lower series of belt driven rolls 31 corresponding to the case progressing rolls 14, and over associated drag-preventing rolls 32, similar to the rolls 26 aforesaid, to another end roller 33 similar to the right-hand roller 17' aforesaid. From the last mentioned driver roll 33 the endless belt 16 is guided for its return over dependently mounted guide rolls 34 to a take-up sheave 35 journaled in a bearing 36 at the left-hand side of the machine, see Fig. 2 and over a freely rotative pulley 37 with return to the first mentioned end roller 17.

Referring again to the closure of the switches 21—24, hereinbefore referred to, use is made of an elevator device 38 having an actuator projection 39 at one end and operable by aid of a shaft 40 and guide means 40' and pressure cylinder 41, to operate a master or controlling switch 42 as readily appreciated from an inspection of Figs. 2 and 4, while said switch 42 is connected in series with the switches 21—24 aforesaid. Operation of the switch 42 after the switches 21—24 are closed completes an electrical circuit from the current supply lines 43, 44, Fig. 4, as hereinafter further explained, which serves to energize the solenoid 52 of a two-way solenoid-operated valve 45, in a pressure air line 46, connected to a suitable cylinder 47, the piston whereof has a rod 48 connected to, what I conveniently term, a pusher-bar 49 along a path determined by guide elements or means 50, Figs. 1 and 2, towards the center of the machine. This pusher-bar 49, in turn, upon closing of the circuit as above mentioned, coacts with all four of the bottle cases 13 and thereby transfers said cases 13 from off the rollers 14 onto rollers 51 on top of the elevator 38, Fig. 3. On movement of the cases 13 onto the rollers 51 of the elevator platform 38 the spring-influenced switches 22, 23, and 24, which may be mounted under said cases or to the side are automatically released, as well as the leading switch 21; and when said switches are all open the solenoid 52 controlling the air-valve 45 becomes de-energized. It is to be here noted that the solenoid 52 controlling the valve 45 is influenced by spacedly aligned coils, hereinafter again referred to. The cases 13 are pushed against a suitable stop 53, Fig. 3, mounted on the elevator platform 38 and by such movement, the leading case is caused to impact a spring-loaded switch 54, Figs. 3, that is conveniently located at about the upper level of the elevator platform 38, but is not connected to said platform. Closure of the switch 54 energizes the solenoid left-hand coil 55, Fig. 4 and thereby changes the position of the valve 45 which effects release of the air pressure in the pipe line 56 for atmospheric exhaust and incidentally admits full air pressure into the line 57, thereby exerting a force in the cylinder 47 effective to retract or return the pusher 49 to its initial position and clear the way for the next or succeeding four cases 13 to be moved onto the elevator platform 38, as before herein set forth.

Closure of the switch 54 also results in energizing one coil 58 influencing another solenoid valve 59 operative to admit pressure air to a cylinder 60. As diagrammatically shown in Fig. 4 the piston-rod 61 of the cylinder 60 when forced in the direction indicated by the associated arrow moves spaced levers 62, and 63 about fixed pivots 64 and 65, respectively; which effects corresponding movement of an operatively coordinated rod 66 in the same direction as the piston 61, whereas a similarly coordinated rod 67 is moved in the opposite direction as indicated by its associated arrow. The rod 66 is secured by means of a set-screw 68 to one component 69 of a pair of clamping jaws but is adapted to slide freely through a bearing 70 made fast to, or integral with, the other and paralleling clamping jaw 71. Similarly the rod 67 is secured by means of a set-screw 72 to the clamping jaw 71 and is arranged to slide through a bearing 73 fast on or integral with the jaw 69. Accordingly it is understood that a motion of the piston-rod 61 in the direction indicated by the associated arrow results in simultaneous movements of the clamp components or jaws 69 and 71 toward each other, and thereby clamp a row of bottle necks and thus hold each bottle 12 securely.

The closure of switch 54 also energizes a solenoid 74 effective to change the position of another air-valve 75, applying pressure through a pipe line 76 and opening a similar line 77 to the atmosphere, and thereby permitting the elevator device 38 to descend and allowing the spring loaded switch 54 to open. The elevator device 38 and the clamping jaws 69, 71 are in cooperative relation so that the said jaws simultaneously engage the bottles 12 whereas the descending elevator 38 removes the cases 13, from the bottles 12.

It is desirable, but not entirely necessary, to delay the descent of the elevator 38 for a short time in order to enable the clamping jaws 69, 71 to engage the necks of the bottles 12 securely. When the descent of the elevator device 38 is not temporarily delayed, it is sometimes found that the bottles 12 in the cases 13 begin to lower before the clamping jaws 69, 71 engage their necks. The slight lowering of the bottles 12 as the elevator device 38 starts its descent causes them to be engaged at a relatively low elevation of the clamping jaws 69, 71. An unduly low position of the bottles 12 sometimes causes them to tip over as they are conveyed away from the machine, as will hereinafter more fully appear.

The change of position for the air-valve 75 is retarded by a time-delay relay 78 which is connected in series with the solenoid 79 and switch 54. It will be noted from Fig. 4 that closure of the switch 54 allows current to flow through a wire 80 and magnet coil 81, which attracts the plunger 82 so that the latter is drawn toward the contacts 83 and 84, thus completing the circuit through the solenoid 79. The delay in time may be predetermined by varying the magnitude of a mechanical or other opposing force acting on plunger 82, as by attaching bellows to the plunger-shaft and regulating the outflow of air from the bellows, as readily understood by those conversant with the art. Time-delay relays are well known in connection with mechanical appliances, while many such devices that operate on different principles may be readily employed without departing from the fundamentals of this invention.

The bottles 12 are securely held in the clamping jaws 69, 71 while the cases 13 descend with the elevator 38. An adjustable switch 85 is conveniently mounted for engagement by the elevator device 38 about midway of its descent, or on another level found to be advantageous, in any particular case. Switch 85 is shown at a relatively low position in Fig. 3. The downward motion of the elevator 38 exerts a thrust by aid of a projection 86 that forces closure of said switch 85 whereby a solenoid-valve 87 is influenced to activate a pressure cylinder 88, conveniently supported by the machine upper frame 134, Fig. 3, while the piston thereof is operatively connected to the clamping jaw carrier 131 by a piston-rod 91, yoke 92, gear 93 and rack means 94, as indicated in Figs. 1 and 3. Cylinder 88 may be attached at either side to the supporting frame 134, either as shown in Figs. 2 and 3; or, it may be supported separately if desired. Member 95, Figs. 1 and 4, of the rack means 94 is attached to the supporting frame of the clamp carrier 131; and it will be apparent that a motion of piston-rod 91 away from the center of the machine rotates the gear 93 counterclockwise, as shown in Fig. 1, thereby moving the clamp carrier 131 in the same direction as said piston-rod and transporting all the bottles 12 originally contained in the four cases 13 to a position above bottle conveyors 96, Figs. 1 and 3. The bottle conveyors 96 may consist of a single broad conveyor, or a plurality of separate conveying units as shown, and be actuated by the drive motor 19 through suitable means 98, Figs. 1 and 3. When the clamping jaw carrier 131 reaches its outermost position and is above the conveyors 96, said carrier contacts a switch 99, closing an electric circuit, which energizes the right-hand coil 100 of the solenoid 59 to effect change in the position of the solenoid-valve 59. This change admits pressure into the pipe line 101 and opens the pipe line 102, to thereby separate the clamping jaws 69 and 71 and move all of the clamps apart. The bottles 12 are thereby released and placed on the conveyors 96, between guide elements 102, Fig. 3, and are transported by said conveyors to the location of a suitable means for soaking or washing treatment, not indicated, in an upright position or that which they occupied when in the cells or sections of the bottle cases 13. Maintenance of the positional relationship between the bottles 12 is often of considerable importance in relation to the efficiency of subsequent operations; and to attain such objective it is essential to deposite said bottles 12 with some care on the conveyors 96, and at a minimum dropping distance between the bottoms of said bottles 12 in respect to the surface of said conveyors 96. Accordingly, the bottles 12 should all be held securely by the clamping-jaws 69, 71 before the elevator device 38 is permitted to begin its descent. When this is done, all the bottles 12 are held at the same elevation and with the desirable minimum clearance between the bottoms thereof and the confronting face of the conveyor 96, which is readily attained by aid of the time-device 78, previously described, that functions to retard the descent of the elevator 38 and also materially helps to maintain the proper spacing of the bottles 12.

The foregoing requirements eventuate as the elevator device 38 continues its descent, the cases 13 being kept in position on the rollers 51 of said device by aid of opposed spring-influenced grip member 104. As long as four cases 13 are positioned on the rollers 51 of the elevator device 38, said cases push the grip members 104 apart to effect closure of a switch 105, Fig. 4, against a contact 106. When the elevator device 38 reaches its lowest position, it closes another switch 107, see Fig. 4, which is positioned directly below a contact 108 on the roller platform 51 aforesaid and brings together contact 108 and contact 109 of the switch 107. Engagement of the contacts 108 and 109 completes an electrical circuit through contact 106 and switch 107 to the coil 110, effective to energize the core 111 of a solenoid-valve 112 which governs a pressure-air cylinder 113. The cylinder 113 moves a pusher member 114, toward a case discharge conveyor, conveniently the lower flight of the conveyor belt 16 with its rollers 31, and simultaneously moves all four empty cases 13 onto said conveyor 115 at one and the same time. The discharge of the cases 13, as just stated, releases the opposing forces acting on the grip members 104, for return to their original positions, and thereby opens and moves the switch 105 from contact with another contact 116, as shown in Fig. 4. When the cases 13 are positioned on the discharge conveyor 115, a roller-switch 117 is closed by the pressure exerted by said cases 13 and pusher-member 114; which effects completion of a circuit through a coil 118 controlling shifting of the solenoid valve 112, and operative to retract the pusher-member 114 to its original position. Return of the pusher-member 114 closes a switch 119 that is wired in series with the contact 116 of the switch 105. Closure of the switch 105 energizes the coil 120 of the solenoid-valve 75 controlling actuation of the pressure-cylinder 41 which again raises elevator device 38 to its upper position, ready for a new cycle. As the elevator device 38 rises, the adjustable switch 85 is opened, de-energizing the solenoid core 87, whereupon a spring 120 changes the setting of the solenoid-valve 121, controlling the air cylinder 88 and returning the clamp-carrier 90 to its original position and placing the clamping-jaws 69, 71 directly above the elevator device 38, thus completing the cycle.

During the cycle just explained the clearance of the case loading platform 51, and retraction of the pusher bar 49, clears the way for the introduction of a fresh charge of bottles 12 in cases 13. The four new cases 13 remain stationary against the loading-table stop 20 during the cycle until the elevator returns to its upper position for closure of the master switch 42, and thereby completes the circuit through said switch 42, as well as switches 21, 22, 23, and 24 preparatory to starting the succeeding operative cycle.

The mechanism for engaging and securely holding the bottles 12 in the machine appears in some detail in Fig. 5, sheet 3. The clamping jaws 69, 71 being supported by the rods 66 and 67, which may be of circular cross-section as shown, square or of other rectangular cross sections, afford a rigid structure with a minimum tendency to sag at points near the middle of the clamp carriage 131. The bottles 12 are supported between cooperating clamp members 122 and 123 which are adapted to move toward, and away from, each other while remaining substantially parallel, to thereby engage and support a bottle, or a series of bottles 12, interposed therebetween by gripping the necks thereof. The clamp member 122 is dependently attached to the bearings 73 and 73' by spaced bolts 124; while said bearing 73 includes a bore 125 to accommodate the rod 66 without material friction in order that the clamp member 122 may slide freely along said rod. The clamp member 123 is similarly attached to the bearings 70, 70' and is provided with a lock-screw 72 which impinges the rod 67 and rigidly secures said bearing 70' in fixed position on said rod 67. It will be seen that a force suitably applied to rod 66 in the direction indicated by the associated arrow imparts uniform movement to the clamp member 122 in the direction indicated. The clamp member 123 is similar to the member 122, while the associated bearing 70 slidably engages on the rod 66. It will now be apparent that the exertion of a force in the direction of the arrow on the rod 67 moves the clamp member 123 in the same direction. The simultaneous application of forces in the direction indicated by the arrows, just above referred to, moves the members 122, 123 together, to thereby grip the necks of any bottles 12 that are interposed between said members 122, 123. Application of the forces in a reverse direction obviously separates the members 122, 123 and releases the bottles 12.

The clamp means just described and shown by Fig. 5, it will be noted, has the vertical or outer face of the clamp members 122, 123 not made of continuous material but comprises a plurality of fingers 128 which provide four spaced voids 129. A layer of rubber 130 is applied to the inner face of each clamp member 122, 123, and is preferably quite soft so that it may be easily vulcanized to the said inner face; or, it can be affixed by a suitable adhesive, or mechanical means. The voids 129 in both clamp members 122, 123 for each set of such clamp members are spaced equally, so as to provide four sets of co-operating voids 129 positioned directly opposite each other. As an illustration, every void 129 in the clamp member 122 cooperates with and moves in line with the opposed void 129 of the clamp member 123 to clasp the neck of a bottle 12 registering between said clamp members. As the clamp members 122, 123 close, the rubber facing or layer 130 of each said member is deformed by the neck of the bottle 12, expanding said layer and engaging the bottle neck with a positive gripping action even when the clamping members 122, 123 are actuated by a rather low air pressure. It will be apparent that in engaging a bell-shaped bottle neck, or any container having a relatively wide top section above a neck of narrower cross section, the stretched rubber layers 130 actually exert on the bottle a force that has an upward component and counters any downward or gravitational tendency on the part of the bottle 12. This feature is of prime importance since it positively assures maintenance of all the bottles 12 at a common level and thereby facilitates the attainment of accurate bottle spacing on the bottle discharging conveyor 96 by affording close vertical clearance between the bottoms of all of said bottles and the surface of such conveyor, as hereinbefore set forth. The fingers 128 further enhance the accuracy of spacing since they are preferably spaced with precision, and on receiving the bottles 12 from the case 13 the clamping members 122, 123 jointly serve to correct any slight irregularity of spacing due to the loose fit of each said bottle 12 in its individual cell in the case 13. The clamp members 122, 123 also ensure that bottles 12 having caps or other means beneath them which tend to tilt them slightly in the cases 13, by coaction with the rubber layers 130 and spaced voids 129 are ensured uniform arrangement, that is essential, in connection with the feeding thereof to subsequent soaking or washing means. The thickness of rubber layers 130, preferably should be substantially uniform to pre-assure accuracy in the spacing of the bottles 12 when removed from the associated cases 13.

Referring now to Figs. 6 to 9, it will be seen that a plurality of substantially parallel clamp members 122, 123 are supported by a suitable clamp carrier 131, that is conveniently supported by spaced rods 132, through the medium of bearings 133 mounted on said rods 132 or rigidly fixed to the main frame members 134 of the machine, see Fig. 7 to best advantage. The pressure-air cylinder 60 is attached to, and supported by the carrier 131; the extended piston-rod 61 whereof transmits movement by a yoke 137 to lever 62 that is, in turn coupled at 138 to the rod 66; fulcrumed at 64 to the carrier frame, Fig. 7. The motion of the rod 61 is also transmitted through a yoke 139 to lever 63 that is, in turn coupled at 140 to the rod 67 fulcrumed at 65, see Figs. 6 and 9.

The clamp carrier 131 is removable and may be replaced by other clamp carriers embodying different spacings of, or even different sizes and numbers of the clamp members 122, 123. The removal of the carrier 131 is accomplished by disengaging the guide rods 132 from frame 134 and sliding said rods out from the bearings 133, in an obvious manner, whereupon the clamp carrier is conveniently lifted out. For rapid replacement, a new clamp carrier 131 is lowered into position and the guide rods 132 re-inserted and secured to the main frame 134. By having on hand several different clamp carriers, the operator of a bottling plant is able to utilize my improved machine for handling all varieties of bottles 12 and cases 13 that he may normally expect to load or unload. By shortening or lengthening the carrier and making minor mechanical adjustments, the machine may be modified to handle different numbers of cases 13 at a time. By varying the effective width of the clamp carrier the machine may be modified to handle narrow or wide cases 13 or, in some instances, he may handle double-rows of cases 13 concurrently. When the inside width of a case 13 is greater than the length of the clamp members 122, 123, said members are adapted to remove short bottles 12 from a deep case 13, since the elevator device 38 may lift the case 13 so high that the clamp members 122, 123 are moved down inside said case, below its top. The clamp members 122, 123 engage the bottles 12 and the case 13 is lowered as previously described.

The rate of speed of the mechanism involved in each step can be controlled by regulating the rate of air flow. In a cylinder actuated means, the speed is easily varied by changing the pressure of the air admitted to the cylinder, or the rate of its admission. The rate of exhausting the air may also be controlled in order to govern the movements of the respective units in my improved machine. As an example, the rate of descent of the elevator device 38 is readily controlled by regulating the rate of flow of air exhausted from cylinder 41.

While I have described my pressure actuating mechanism as a compressed air system, I am also able to use oil or other convenient pressure-transmitting fluids in operating the machine.

The mode of operation of my improved container handling machine will be readily understood from Figs. 10 and 11, sheet 6, more particularly. Figs. 10 and 11 diagrammatically indicate a typical cycle employed in the unloading of bottles 12 from a case 13. The cycle begins, as shown in Fig. 10, by passage of the cases 13 from off the feeding-in rolls 141, Fig. 4, onto the endless conveyor belt 16 which transports the four cases 13 and contained bottles 12 to a position in front of pusher 49, which is automatically actuated, and the case 13 is thereby moved transversely along a line at an angle to the line of travel of the case conveyor onto elevator 38. The position of the bottles 12 and cases 13 on the elevator 38 is shown in dotted lines. The pusher 49 then retracts to its original position. It will be observed that in the transverse movement of the cases 13, the necks of the bottles 12 pass between the confronting clamp members 122, 123; which being automatically actuated, said clamp members approach each other and securely grip the necks of the bottles 12. At this point the elevator 38 automatically descends, carrying the case 13 to a lower level but leaving the bottles 12 at the original level. As soon as the elevator 38 reaches its lower position, the clamp-members 122, 123 and bottles 12 travel transversely as indicated by arrow a, Fig. 10. As shown in Fig. 11, the clamp-members 122, 123 conduct the bottles 12 to a position above the conveyor 96. The bottles 12 are conveyed by the conveyor 96 to a subsequent operation such as a bottle soaking or washing machine. Meanwhile the pusher member 114 moves the empty case 13 transversely in the direction indicated by arrows b placing it, as indicated in dotted lines, on a case conveyor 115 which conducts said empty case to the desired location for cleaning, or other operation, preparatory to refilling with fresh bottles. The pusher 114 then retracts, the elevator 38 rises, and the clamp members 122, 123 return to their original position directly above said elevator, as indicated by the arrow c in Fig. 11, and the cycle is complete. Since each mobile unit has now been retracted to its normal position, the machine is ready for repeating the cycle as another full bottle case 13 passes onto conveyor 16.

It is to be understood that the schematic views Figs. 10 and 11 are merely illustrative of the basic movements of the units constituting my invention and are, accordingly, not intended to be construed as limitative. It will be further apparent that the cycle indicated is not restricted in its application to the process of unloading a bottle or bottles 12 from a case, or cases 13, since a simple reversal of the operative sequences and directions of motions, and slight rearrangement of parts, provides a packing or loading device for placing a bottle or bottles 12 in an empty case 13. For a loading operation, in the direction indicated by the dotted arrow d, Fig. 11, the conveyor 96 may move full bottles into position under the clamp-members 122, 123 for clamping action while the conveyor 115 moves empty cases 13 to a position in front of the pusher 49', shown in dotted lines, which is similar to pusher 49, but on a lower level and is positioned as to move cases in the direction opposite to that indicated by the arrow d. The clamp-members 122 and 123 travel to a position directly above the elevator 38, the empty cases 13 being pushed on said elevator 38 by the pusher 49' before said elevator rises. Pusher 49' retracts to its original position, the elevator 38 rises to the proper level where the clamp-members 122, 123 open, and the bottles 12 are deposited in the empty cases, whereupon said clamp-members open and move toward the conveyor 96, Fig. 10. The cases 13 are then moved along by means of a pusher 114' to a conveyor 142, indicated by dot-and-dash lines, Fig. 10, for conduction away to a truck loading platform. Pusher 114' is similar to pusher 114, or may be said pusher in re-arranged position. If desired, full cases 13 may, instead, be lowered on the elevator 38 and moved therefrom by means of new cases which are pushed on said elevator by the pusher 49', displacing the filled case therefrom. The displaced cases 13 may then be conducted to any desired location by means of a chute or conveyor. It is accordingly apparent that my improved case handling machine is readily adapted to load bottles 12 in cases 13 and to unload bottles from such cases. The same machine can be modified to perform either operation by effecting slight mechanical adjustments the nature of which will be apparent to those skilled in the mechanical arts.

To effect engagement of bottles 13 by the clamp-members 122, 123, the bottles 12 are previously spaced in accordance with their desired final positions in the cases. This is sometimes accomplished by the filling and capping machine, or other suitable means immediately preceding the loading operation; but such procedure may be otherwise accomplished by aid of any commercially available device which spaces and counts bottles on a conveyor belt.

A significant advantage in the operation of my improved article handling machine is the high bottle handling capacity per unit amount of floor space; which I attribute, in part, to the fact that my machine as a unit is capable of handling eight dozen or more bottles in one cycle; and furthermore to the fact that all movements of the bottles and cases handled by my machine are directly along straight lines.

While this specification and the accompanying drawings disclose a preferred embodiment of my invention, it is to be understood that the construction, wiring, piping and the like may be varied in design without departing from the scope of the invention as defined in the following claims. It will also be readily understood that the specific features of the invention, as described and shown, render it particularly adapted to handle articles having a cylindrical or rounded configuration, and to handle containers other than bottles or cans as well as other rounded containers and articles. It is still further apparent that the means, described and shown herein, is capable of handling articles of other shapes, such as articles of square or other rectangular cross section, or polygonal cross section, and that such articles may be held in suitable containers other than cases.

Moreover, while I have illustrated and described one form of my article clamp wherein a layer of rubber is affixed to a non-yieldable material, it is understood that equivalent article engaging elements such as an endless rubber band or belt, of flat, circular or other cross section may be stretched around an entire clamp member to bridge spaced voids and provide easily replaceable bottle engaging means, and that equivalent yieldable article engaging elements may otherwise be disposed across spaced voids to provide novel bottle engaging means.

Having thus described my invention, I claim:

1. An article handling machine comprising a supporting structure; article clamping means slidably supported by said structure; said clamping means including gripper elements reciprocable toward and from one another in a substantially horizontal plane, an elevator below said clamping means adapted to assume an upper level and a lower level; a plurality of conveyors arranged adjacent to said supporting structure and positioned at levels substantially corresponding to the upper and lower levels of said elevator; actuator means operatively connected to reciprocate the clamping means in said substantially horizontal plane; a clamp mover supported on said supporting structure and operatively connected to said clamping means so as to move the entire clamping device as a unit with respect to the supporting structure and said elevator in a substantially horizontal plane; a plurality of pushers carried by the supporting structure at levels substantially corresponding to the levels of said conveyors and adapted to move an article container in a substantially horizontal plane between said conveyors and said elevator, and automatic fluid pressure means for operating said clamping means, elevator, and actuator means in timed relation with one another.

2. A machine for handling articles and article receptacles, comprising a platform moveable up and down to assume positions at upper and lower levels, receptacle conveyor means for advancing receptacles to positions adjacent said platform, pusher means for moving said receptacles onto said platform, article conveyor means for moving articles between external positions and positions adjacent said platform, article gripping means movable between positions respectively above said platform and above said article conveyor means, to transport articles between said positions, operating means for activating and inactivating said article gripping means to engage and release the articles, pusher means for moving said receptacles from said platform subsequent to the operation of said article gripping means, and case detecting means operable in response to the movement of each case to control the movements of said platform, said pushers and said article gripping means.

3. A machine for removing articles from receptacles, comprising an elevator platform moveable up and down to upper and lower levels, means for raising and lowering said elevator platform, a receptacle conveyor for feeding a receptacle to a position adjacent said elevator platform, pusher means operative at an angle to the path of travel of said conveyor for advancing the receptacle from said conveyor to said elevator platform, article engaging means above said conveyor upper level, an article conveyor adjacent said elevator platform, means for moving said article engaging means between positions respectively above said elevator platform and above said article conveyor, receptacle detecting means for activating said article engaging means in response to the movement of said receptacle on said elevator platform, means for actuating said article engaging means to engage the articles in response to the movement of the receptacle on the elevator platform, and means for lowering said elevator platform in timed relation therewith, thereby separating the articles and the receptacle.

4. A machine for handling articles and article receptacles, comprising a platform moveable up and down to assume positions at upper and lower levels, receptacle conveyor means for advancing receptacles to positions adjacent said platform, switch means in the path of advancement of said receptacles on said conveyor and actuated by contact with the receptacles when adjacent said platform, first pusher means at one of said upper and lower levels, connecting means operable in response to the actuation of said switch means and connected to said first pusher means for moving said receptacles onto said platform in response to said switch means, article conveyor means for transporting articles between external positions and positions adjacent said platform, article gripping means moveable between positions respectively above said platform and above said article conveyor means, to transport articles between said positions, operating means for activating and inactivating said article gripping means to engage and release the articles, means for lowering said platform in timed relation to the operation of said article gripping means above said platform, and second pusher means at the other of said upper and lower levels for moving said receptacles from said platform subsequent to the operation of said article gripping means.

5. A machine for handling articles and article receptacles, comprising a platform moveable up and down to assume positions at upper and lower levels, receptacle conveyor means for advancing receptacles to positions adjacent said platform, reciprocable pneumatically actuated pusher means arranged adjacent said conveyor means, control means actuated in response to the movement of the receptacles on the conveyor, said control means being connected to cause said pusher means to undergo continuous uninterrupted movement in a single plane to move said receptacles onto said platform, detecting means for effecting the continuous retraction of said pusher in response to the arrival of the receptacles on said platform, article conveyor means adjacent said platform, article gripping means moveable between positions respectively above said platform and above said article conveyor means, pneumatically actuated advancing means including an air cylinder actuated in response to the movement of the platform for moving said article gripping means to transport articles between said positions, means for regulating the individual air flow rates of the actuating air in said pneumatically actuated means thereby regulating the timed relationship of movement of the pneumatically actuated parts, and operating means for activating and inactivating said article gripping means to engage and release the articles.

6. A machine for removing articles from receptacles, comprising a receptacle conveyor, conveyor switch means operative in response to movement of receptacles on said receptacle conveyor, an elevator adjacent said receptacle conveyor, pusher means actuated by said conveyor switch means to move the receptacles from the conveyor to the elevator, elevator switch means operative in response to arrival of the receptacles on said elevator when said elevator is in its elevated position, article engaging means in the form of opposed grippers movable toward and from one another above said elevator, pneumatic means operative in response to said elevator switch means to activate said article engaging means by moving said grippers toward one another to engage the articles, elevator operating means also energized in response to said elevator switch means to lower the elevator, an article handling conveyor spaced from said elevator, and means for moving the article engaging means as a unit from a position above the elevator to a position above the article handling conveyor in response to the lowering of the elevator.

7. A machine for removing articles from receptacles, comprising a receptacle conveyor, conveyor switch means operative in response to movement of receptacles on said receptacle conveyor, an elevator adjacent said receptacle conveyor, pusher means actuated by said conveyor switch means operative to move the receptacles from the conveyor to the elevator, elevator switch means operative in response to arrival of the receptacles on said elevator when said elevator is in its elevated position, article engaging means in the form of opposed grippers movable toward and from one another above said elevator, pneumatic means operative in response to the operation of said elevator switch means to activate said article engaging means by moving said grippers toward one another to engage the articles, elevator operating means also energized in response to said elevator switch means to lower the elevator, time delay apparatus connecting said elevator switch means and said elevator operating means to delay the lowering of the elevator until after the activation of the article engaging means, to engage the article, an article handling conveyor spaced from said elevator, and means for moving the article engaging means as a unit from a position above the elevator to a position above the article handling conveyor, in response to the lowering of the elevator.

8. A machine for removing articles from receptacles, comprising an elevator platform moveable up and down to upper and lower levels, means for raising and lowering said elevator platform, a receptacle conveyor for feeding a receptacle to a position adjacent said elevator platform, pusher means for advancing the receptacle from said conveyor to said elevator platform, article engaging means above said conveyor upper level, an article conveyor adjacent said elevator platform, means for moving said article engaging means between positions respectively above said elevator platform and above said article conveyor, means for activating said article engaging means to engage the articles in response to the movement of the receptacle on the elevator platform, and for lowering said elevator platform in timed relation therewith, thereby separating the articles and the receptacle, and clamping means yieldably mounted on said elevator in position to engage and retain the receptacles, said clamping means serving to maintain the receptacles on said platform in opposition to friction with the articles as the platform is lowered away from said article engaging means.

9. A machine for handling articles and article receptacles, comprising a platform moveable up and down to assume positions at upper and lower levels, receptacle conveyor means for advancing receptacles to positions adjacent said platform, pusher means for moving said receptacles onto said platform, automatic fluid pressure means connected to operate said pusher means in response to the movement of said platform, article conveyor means adjacent the upper level of said platform, an article gripping device having opposed article engaging elements moveable bodily toward and away from one another in a single plane substantially parallel to the plane of the article conveyor with capacity to engage and release the articles, said article gripping means being moveable as a unit between positions respectively above said platform and above said article conveyor means, means for moving said gripping means to transport articles between said positions, said moving means including an automatic fluid pressure device operative in response to the operation of the platform, operating means for activating and inactivating said article gripping means to engage and release the articles, and pusher means for moving said receptacles from said platform subsequent to the operation of said article gripping means.

10. The invention defined in claim 9 further characterized by the fact that the article engaging elements are spaced above the article conveyor at a distance substantially equal to the height of the articles, whereby the bottom surfaces of the articles are substantially at or only slightly above the level of the article conveyor.

11. A machine for removing bottles from a case comprising an elevator, operating means for moving said elevator up and down between upper and lower levels, means for placing said case on said elevator, a clamp carrier above said upper level, a bottle conveyor at substantially said upper level for carrying away the bottles, said clamp carrier being reciprocable between limit positions above said elevator and above said conveyor, a clamp carrier actuating device operatively connected to reciprocate said clamp carrier between said limit positions, a plurality of sets of bottle clamps carried by said clamp carrier, each set comprising a pair of substantially parallel elongated gripper bars that are movable toward and away from each other to grip and release a plurality of aligned bottles, on opposite sides thereof, pneumatic means for operating the clamp sets, automatic control means operative to close said sets of clamps on the necks of the bottles when the clamp carriage is over the elevator, automatic means for moving the elevator and case downwardly to free the bottles from the case when the clamps are thus closed, automatic means connected to the clamp carrier actuating device for moving the carrier and bottles to said limit position over said bottle conveyor when the bottles are free of the case, and automatic means for suddenly opening said sets of clamps and releasing the bottles when said clamp carriage is over the bottle conveyor.

12. A machine for removing bottles from a case comprising an elevator, operating means for moving said elevator up and down between upper and lower levels, means for placing a case on said elevator, a bottle clamping device above the upper level of said elevator, means for operating said bottle clamping device and clamping the upper portions of the bottles when the elevator is at said upper level, means operative after the bottles are clamped for lowering the elevator, case engaging means for securing the case to the elevator, and automatic means connected to the case engaging means with capacity to secure the case to the elevator to cause the case and elevator to move downwardly as a unit when the bottles are held by the bottle clamping device.

13. The machine defined in claim 12 wherein the bottle clamping device comprises a plurality of sets of parallel elongated clamps connected to a pair of elongated actuator bars which extend transversely of said clamps and serve to move the clamps of each set toward and away from one another to grip and release the bottles, and wherein clamp operating means are connected to said actuator bars to move said clamps toward and away from one another to grip and release the bottles.

14. The machine defined in claim 13 wherein the clamps are suspended from the actuator bars, and wherein the actuator bars are supported on a carriage which is movable toward and from its position above the elevator.

15. The machine defined in claim 14 wherein a conveyor is provided for carrying away the bottles wherein means are provided for moving said carriage from its position above the elevator to a position above the conveyor, and wherein automatic means are provided for operating the clamp operating means and thereby releasing the bottles when the carriage is positioned above said conveyor.

16. A machine for removing bottles from a case comprising an elevator for the case, operating means for moving said elevator up and down between upper and lower levels, a clamp carrier above said upper level, a plurality of sets of bottle clamps carried by said clamp carrier, said clamps comprising spaced substantially parallel elongated plates, means for moving the plates of each set toward and away from one another to grip and release the bottles, a bottle conveyor adjacent said elevator at substantially said upper level, means for moving said clamp carrier between positions directly above said elevator and directly above said bottle conveyor, means for gripping the bottles in the clamps, means for lowering the elevator and case while the bottles are thus gripped, means for releasing said bottles to said conveyor, said clamping plates being in substantial alignment with the direction of movement of said conveyor, and automatic fluid pressure means for operating said clamps, elevator operating means, and clamp carrier moving means in timed relation with one another.

17. The machine defined in claim 16 wherein the clamping plates consist of metal provided with a yieldable surface material having the characteristics of rubber, said surface material being arranged for contacting and gripping the bottles.

18. The machine defined in claim 16 wherein the movement of the clamp carriage is in substantial alignment with the movement of the bottle conveyor.

19. The machine defined in claim 16 wherein the means for moving the bottle clamping plates toward and away from one another comprises a pneumatic cylinder and a mechanical linkage operatively connected to said pneumatic cylinder.

20. The machine defined in claim 16 wherein the means for moving the clamp carrier to its position above the bottle conveyor comprises a pneumatic cylinder and a piston operatively connected to said carrier.

21. The machine defined in claim 16 wherein a case clamping means is carried on said elevator, said case clamping means being movable toward the case to clamp said case on said elevator, and wherein an automatic case clamp operator is provided for clamping the case on the conveyor when the bottles are gripped by the bottle clamping means.

22. The machine defined in claim 16 further characterized by the fact that a reciprocable case pusher is disposed adjacent said elevator at substantially the lower level thereof, that pnuematic means are provided for actuating said pusher to displace the case from said elevator at said lower level, and that control means are provided for operating said actuating means in response to the operation of the elevator.

23. A machine for removing bottles from a case comprising an elevator, operating means for moving said elevator up and down between upper and lower levels, means for placing said case on said elevator, a clamp carrier above said upper level, a bottle conveyor for carrying away the bottles, said clamp carrier and said elevator being relatively reciprocable laterally between limit positions wherein the carrier is directly over said elevator and wherein the carrier is spaced laterally of said elevator, operating means connected to cause said relative reciprocation between said limit positions, a plurality of sets of bottle clamps carried by said clamp carrier, each set comprising a pair of substantially parallel elongated grippers that are movable toward and away from each other to grip and release a plurality of aligned bottles on opposite sides thereof, fluid pressure means for operating the clamp sets, automatic control means operative to close said sets of clamps on the necks of the bottles when the clamp carriage is directly over the elevator, automatic means for moving the elevator and case downwardly relative to said clamp sets to free the bottles from the case when the clamps are thus closed, automatic actuator means connected to said operating means for relatively moving the carrier and elevator when the bottles are free of the case, thereby spacing said carriage laterally of said elevator, automatic means for opening said sets of clamps and releasing the bottles when said clamp carriage is spaced laterally of said elevator, and automatic fluid pressure means for operating said sets of clamps, elevator and actuator means in timed relation to one another.

24. In a machine for removing bottles from a case the combination comprising an elevator for the case, a clamping means for the bottles including a plurality of sets of elongated substantially parallel grippers that are movable toward and away from each other to grip and release a plurality of aligned bottles, means for placing said case on said elevator, automatic mechanism connected to the clamping means for bringing said grippers toward one another to grip the bottles when the clamping means is located vertically above said support, elevation changing means for moving said elevator downwardly away from said clamping means, thereby separating the bottles from the case, automatic actuator means for actuating said elevation changing means in response to the closing movement of said clamping means, a conveyor for the bottles, another conveyor for the cases, automatic mechanism operable in response to said elevator movement for depositing the bottles and cases on their respective conveyors after completion of said elevator movement, and automatic fluid pressure means for operating said clamp means, elevator and actuator means in timed relation to one another.

References Cited in the file of this patent

UNITED STATES PATENTS

| Number | Name | Date |
|---|---|---|
| 1,480,859 | Harding | Jan. 15, 1924 |
| 1,507,864 | Smith | Sept. 9, 1924 |
| 1,567,725 | Freese | Dec. 29, 1925 |
| 1,609,802 | Ekstrom | Dec. 7, 1926 |
| 1,898,393 | Rickers | Feb. 21, 1933 |
| 1,904,720 | Douglass | Apr. 18, 1933 |
| 2,212,237 | Jenkins | Aug. 20, 1940 |
| 2,400,542 | Davis | May 21, 1946 |
| 2,452,927 | Hammen | Nov. 2, 1948 |
| 2,523,025 | Jeppson et al. | Sept. 19, 1950 |
| 2,634,874 | Rideout | Apr. 14, 1953 |
| 2,635,773 | Ardell | Apr. 21, 1953 |